United States Patent
Hardy et al.

(10) Patent No.: US 6,464,149 B1
(45) Date of Patent: Oct. 15, 2002

(54) ACTUATOR ARRANGEMENT

(75) Inventors: Martin Paul Hardy; Michael Peter Cooke, both of Gillingham; Andrew John Hargreaves, Boughton, all of (GB)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/699,276

(22) Filed: Oct. 27, 2000

(30) Foreign Application Priority Data

Oct. 28, 1999 (GB) .............................. 9925410

(51) Int. Cl.[7] .............................................. B05B 1/08
(52) U.S. Cl. ................................. 239/102.2; 239/533.8
(58) Field of Search .......................... 239/102.2, 533.8, 239/102.1; 123/498; 310/326, 327, 328, 346

(56) References Cited

U.S. PATENT DOCUMENTS

| | | | |
|---|---|---|---|
| 4,011,474 A | | 3/1977 | O'Neill |
| 4,635,849 A | * | 1/1987 | Igashira et al. .......... 239/102.2 |
| 4,725,002 A | * | 2/1988 | Trachte ................... 239/102.2 |
| 4,821,726 A | * | 4/1989 | Tamura et al. ............... 123/498 |
| 4,909,440 A | * | 3/1990 | Mitsuyasu et al. ....... 239/533.8 |
| 5,004,945 A | * | 4/1991 | Tomita et al. .............. 123/498 |
| 5,031,841 A | | 7/1991 | Schafer |
| 5,875,764 A | * | 3/1999 | Kappel et al. .............. 123/467 |

FOREIGN PATENT DOCUMENTS

| | | |
|---|---|---|
| DE | 4005455 | 2/1989 |
| DE | 19519192 | 6/1996 |
| FR | 2743129 | 12/1995 |

\* cited by examiner

*Primary Examiner*—Lesley D. Morris
*Assistant Examiner*—Dinh Q. Nguyen
(74) *Attorney, Agent, or Firm*—Thomas N. Twomey

(57) ABSTRACT

An actuator arrangement comprising a piezoelectric element formed from a piezoelectric material, a first end of the piezoelectric element cooperating with an input piston member slidable within a bore. A surface associated with the input piston member defines, in part, a control chamber for fluid, fluid pressure within the control chamber acting on a surface associated with an output piston member. The fluid within the control chamber is substantially incompressible such that, in use, movement of the input piston member is transmitted to the output piston member, the piezoelectric element being arranged within a second chamber for fluid such that fluid pressure within the second chamber exerts a force on at least a part of the surface of the piezoelectric element which serves to oppose the load exerted on the piezoelectric element due to fluid pressure within the control chamber, thereby suppressing distortions in the piezoelectric material.

16 Claims, 2 Drawing Sheets

ACTUATOR ARRANGEMENT

The invention relates to an actuator arrangement of the type comprising a piezoelectric element. In particular, but not exclusively, the invention relates to an actuator arrangement for use in controlling valve needle movement in a fuel injector.

Piezoelectric actuators are used in fuel injectors to control movement of a valve needle within a fuel injector nozzle body, movement of the valve needle being used to control the delivery of fuel into an engine cylinder or other combustion space.

FIG. 1 is a schematic diagram of a conventional piezoelectric actuator arrangement of this type. The arrangement includes a piezoelectric stack 10 formed from a plurality of piezoelectric elements. One end of the piezoelectric stack 10 abuts a part of a fuel injector housing 11, the other end of the piezoelectric stack 10 being in engagement with an input piston 12, having a diameter $d_i$, which is moveable within a bore 13 provided in the housing 11. The axial length of the piezoelectric stack 10 is controlled by controlling the energization level of a piezoelectric stack 10, the energization level of the piezoelectric stack 10 being controlled by applying a voltage across the stack 10. The actuator arrangement also includes an output piston 16 having a diameter $d_o$ which is less than the diameter $d_i$ of the input piston. The output piston 16 is moveable with the fuel injector valve needle (not shown), the output piston 16 being exposed to fuel pressure within a control chamber 14 which is supplied with fuel, in use, either through leakage or by means of an appropriate valve arrangement (not shown). The piezoelectric stack 10 may be housed directly within the fuel injector housing 11 or may be housed within a chamber in communication with a low pressure fuel reservoir or drain. The input piston 12 and the bore 13 form a substantially fluid tight seal such that, in use, little or no fuel is able to escape from the control chamber 14.

In use, assuming a substantially constant load is applied to the end face of the output piston 16 remote from the control chamber 14, when the length of the piezoelectric stack 10 is increased, the input piston 12 moves inwardly within the bore 13. As fuel within the control chamber 14 is substantially incompressible, the volume of fuel within the control chamber 14 remains substantially constant during inward movement of the input piston 12. As a result, the output piston 16 will be displaced by an amount which is greater than the displacement of the input piston 12 by the ratio $d_i^2/d_o^2$.

A problem exists in conventional actuator arrangements of the aforementioned type in that, under conditions in which a relatively high actuation force is required, fuel pressure within the control chamber 14 applies a relatively large load to the piezoelectric stack through the input piston 12. The relatively large load applied to the stack results in a reduced displacement of the piezoelectric stack 10. It is thought that this displacement suppression is due to domain switching of the piezoelectric dipoles which occurs as a direct result of uniaxial straining of the piezoelectric material lattice. In practice, piezoelectric materials which are relatively "soft" are often preferred to those which are relatively "hard" as it is possible to achieve a greater displacement with such materials. However, the displacement of piezoelectrically soft materials is compromised to a greater extent due to domain switching than for relatively hard piezoelectric materials. Typically, relatively soft piezoelectric materials exhibit a pronounced displacement suppression at uniaxial compressive stresses in excess of 40 MPa which, for many applications, does not permit a sufficient actuation force, or actuation stroke, to be obtained.

It is an object of the present invention to provide an actuator arrangement which alleviates the aforementioned disadvantage.

According to a first aspect of the present invention, an actuator arrangement comprises a piezoelectric element formed from a piezoelectric material, a first end of the piezoelectric element cooperating with an input piston member slidable within a bore, a surface associated with the input piston member defining, in part, a control chamber for fluid, fluid pressure within the control chamber acting on a surface associated with an output piston member, the fluid within the chamber being substantially incompressible such that, in use, movement of the input piston member is transmitted to the output piston member, the piezoelectric element being arranged within a second chamber for fluid such that fluid pressure within the second chamber exerts a force on at least a part of the surface of the piezoelectric element which serves to oppose the load exerted on the piezoelectric element due to fluid pressure within the control chamber, thereby suppressing distortions in the piezoelectric material.

The actuator may include a single piezoelectric element or may include a stack of piezoelectric elements.

The invention provides the advantage that lattice distortions in the piezoelectric material, which would otherwise compromise displacement of the piezoelectric element, are suppressed. In particular, such distortions occur when relatively large loads are applied to the piezoelectric element or stack of piezoelectric elements. In the present invention, even when the load applied to the piezoelectric element is relatively high, displacement of the piezoelectric element is not compromised as such lattice distortions are suppressed.

The input piston member may have a diameter which is greater than that of the output piston member. In this case, the output piston member is caused to be displaced by a greater amount than the input piston member.

Alternatively, the input piston member may have a diameter which is smaller than that of the output piston member such that the output piston member is caused to be displaced by a smaller amount than the input piston member. This is particularly advantageous if the actuator is to be employed in applications where only relatively small displacements are required.

The actuator arrangement may include a clearance passage which permits fluid to escape from the control chamber to the second chamber, in use, such that fluid pressures within the second chamber and the control chamber tend to equalise. The clearance passage preferably has a restricted diameter to ensure fluid flow from the control chamber to the second chamber occurs at a relatively low rate. In this way, any loss of the actuation stroke due to the reduction in fluid pressure within the control chamber as fluid flows through the clearance passage is minimised.

The clearance passage may be defined by one or more drillings provided in a housing for the actuator arrangement.

Alternatively, the clearance passage may be defined between the input piston member and the bore within which the input piston member is slidable.

Alternatively, the control chamber may be substantially sealed from the second chamber, the actuator arrangement further including means for measuring fluid pressure within the control chamber and means for supplying fluid to the second chamber in response to the measured fluid pressure such that fluid pressure within the second chamber is maintained at a level substantially equal to that within the control chamber, in use.

This provides the advantage that, as fluid is unable to escape from the control chamber to the second chamber, there is no loss of actuation stroke. This is particularly important in applications for which a relatively long actuation stroke is required.

The actuator arrangement of the present invention may be used in a fuel injector arrangement to control movement of a fuel injector valve needle. The fluid within the control chamber may therefore conveniently take the form of fuel to be delivered by the injector arrangement.

According to a further aspect of the present invention, there is provided a fuel injector comprising an actuator arrangement as herein described, the fuel injector comprising a valve needle which is operable under the control of the actuator arrangement, the valve needle being engageable with a seating to control fuel delivery through an injector outlet, wherein the second chamber is arranged to receive pressurised fuel, in use, through an injector inlet.

Preferably, the second chamber within which the piezoelectric element is located is arranged within a flow path between the injector inlet and injector outlet.

The invention will now be described, by way of example only, with reference to the accompanying figures in which.

Figure 1:
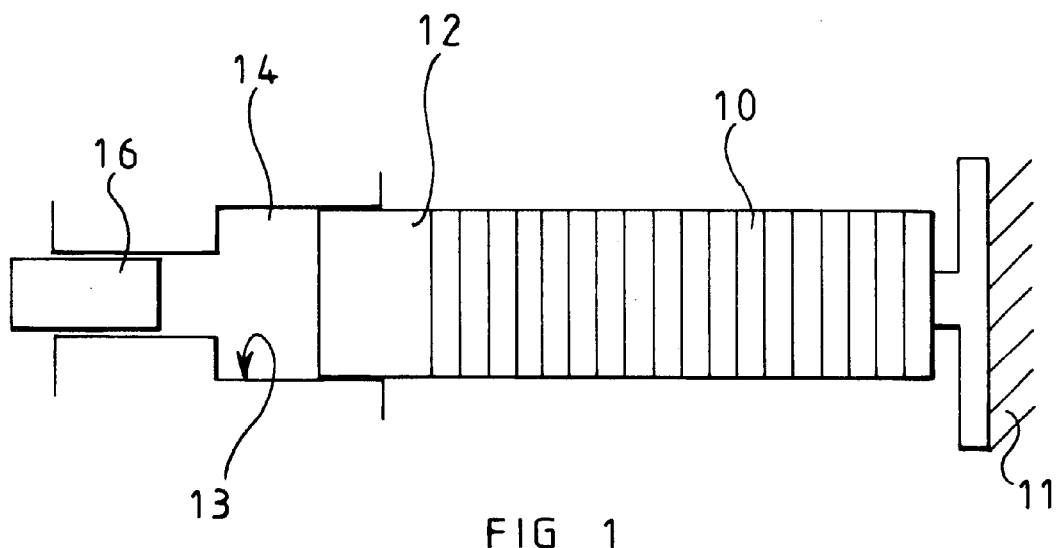
FIG. 1 is a schematic view of a conventional piezoelectric actuator arrangement.
Figure 2:
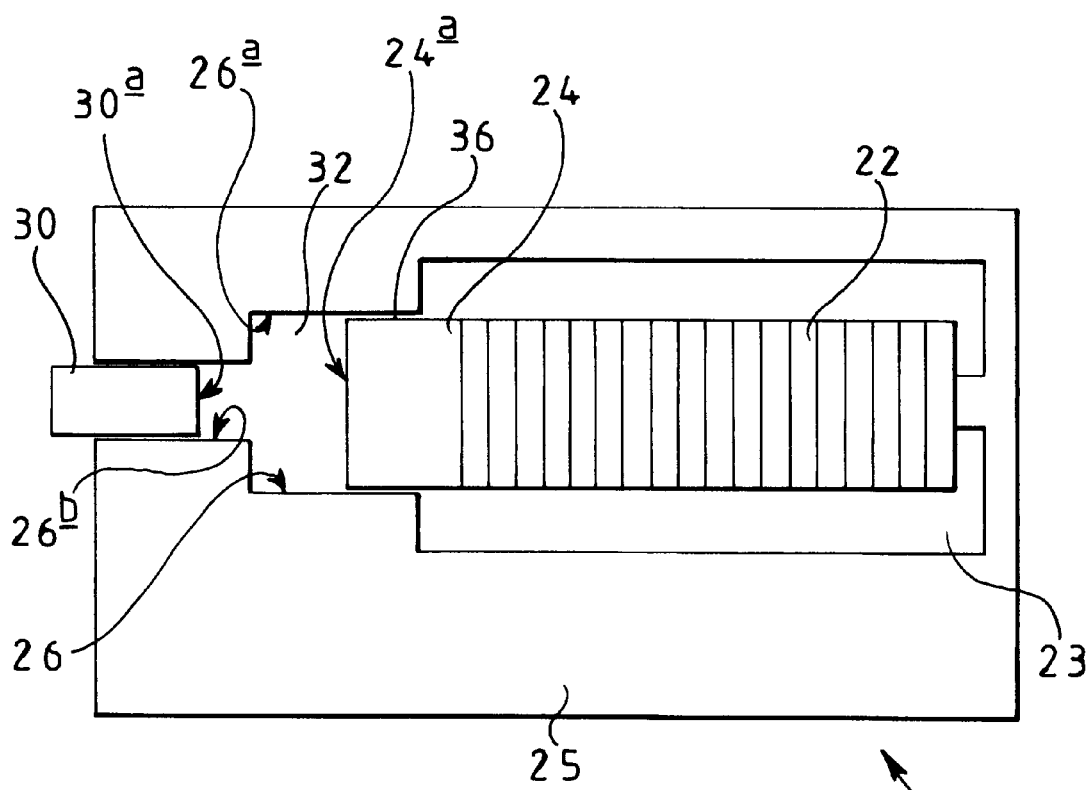
FIG. 2 is a schematic view of a first embodiment of the actuator arrangement of the present invention.

Referring to FIG. 2, an actuator arrangement, referred to generally as 20, suitable for use in a fuel injector arrangement, includes a stack piezoelectric 22 having a plurality of piezoelectric elements. The piezoelectric stack 22 is housed within a chamber 23 defined in an actuator housing 25. One end of the piezoelectric stack 22 abuts a part of the housing 25 and the other end of the stack 22 cooperates with an input piston member 24, having a diameter $d_i$, which is slidable within an enlarged region 26a of a bore 26 provided in the actuator housing 25. The bore 26 also includes a region 26b of smaller diameter, an output piston member 30, having a diameter $d_o$ which is smaller than that of the input piston 24, being slidable within the region 26b of the bore. Typically, the output piston 30 may be connected with a valve needle (not shown) of a fuel injector arrangement such that the actuation force delivered by the output piston 30 is transmitted to the valve needle.

The input piston 24 includes an end surface 24a and the output piston includes an end surface 30a, the end surfaces 24a, 30a defining, together with the bore 26, a control chamber 32 for fuel which is supplied with fuel either through leakage or by means of an appropriate valve arrangement (not shown). The input piston 24 and the enlarged region 26a of the bore 26 together define a clearance passage 36 for fuel between the control chamber 32 and the chamber 23 such that, in use, fuel is able to escape from the control chamber 32 to the chamber 23. The diameter of the clearance passage 36 is chosen to ensure that fuel is only able to escape from the control chamber 32 at a relatively low rate so as not to compromise operation, as will be described hereinafter.

The axial length of the piezoelectric stack 22 is controlled by controlling the energization level of the stack 22, the energization level being controlled by applying a voltage across the stack 22. Typically, the voltage may be applied across the stack 22 by means of an electrical connector (not shown) which is connected to a voltage supply and connecting leads which connect the piezoelectric stack 22 to the electrical connector.

In use, when a voltage is applied to the piezoelectric stack 22, the axial length of the piezoelectric stack 22 increases, thereby moving the input piston 24 inwardly within the enlarged region 26a of the bore 26. As fuel within the control chamber 32 is substantially incompressible, the volume of fuel remains substantially constant during inward movement of the input piston 24. Inward movement of the input piston 24 is therefore transmitted to the output piston 30 through the fuel within the control chamber 32. It will therefore be appreciated that the surface 24a of the input piston 24 and the surface 30a of the output piston define movable boundaries of the control chamber 32. As the diameter $d_i$ of the input piston 24 is greater than the diameter $d_o$ of the output piston 30, the output piston 30 will be displaced by an amount greater than the input piston displacement by the ratio $d_i^2/d_o^2$.

Fuel pressure within the control chamber 32 also exerts a load on the piezoelectric stack 22. As fuel within the control chamber 32 is able to flow past the input piston 24 to the chamber 23 through the clearance passage 36, the fuel pressures within the chambers 32, 23 will tend to equalise. Fuel pressure within the chamber 23 therefore applies a compressive load to the exterior surface of the piezoelectric stack 22 which serves to oppose the load applied to the stack 22 due to fuel pressure within the control chamber 32. The piezoelectric stack 22 is therefore said to be under hydrostatic compression. Distortions of the lattice of the piezoelectric material which would otherwise occur, particularly when axial compression of the piezoelectric stack 22 is increased, are therefore suppressed. The piezoelectric material is therefore substantially insensitive to the relatively large loads applied to the stack 22 and there is no loss of displacement activity of the piezoelectric material as the actuation force is increased.

As fuel is only able to escape from the control chamber 32 through the clearance passage 36 at a relatively low rate, any loss of the actuation stroke due to leakage from the control chamber 32 is negligible. In particular, for applications in which a relatively short actuation stroke is required, any loss of actuation stroke will be insignificant. It will be appreciated that the control chamber 32 may be provided with any hydraulic fluid, and not necessarily fuel, having a viscosity which ensures the rate of flow of fluid from the control chamber 32 to the chamber 23 is sufficiently low so as to minimise any loss of the actuation stroke.

Figure 3:
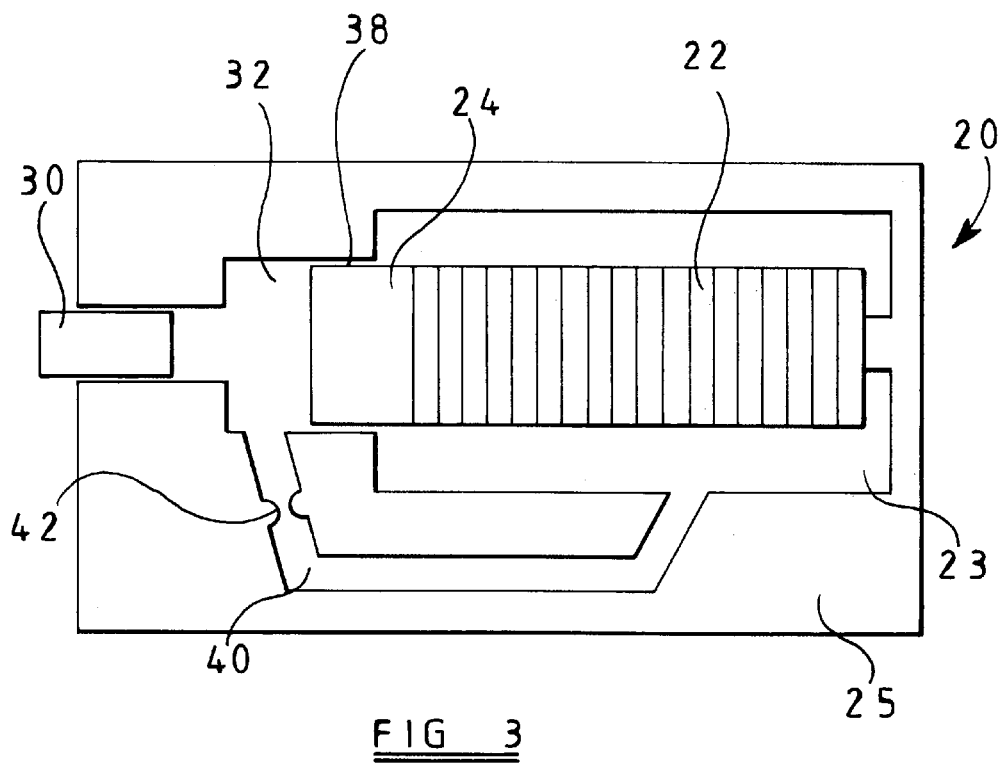
FIGS. 3 and 4 are schematic views of alternative embodiments.

FIG. 3 shows an alternative embodiment of the invention in which like numerals are used to denote similar parts to those shown in FIG. 2. In this embodiment, a substantially fluid tight seal 38 is provided between the input piston 24 and the enlarged region 26a of the bore 26. Thus, fuel within the control chamber 32 is unable to flow from the control chamber 32, past the input piston 24 to the chamber 23. Instead, the housing 25 is provided with a passage 40 which provides communication between the control chamber 32 and the chamber 23, the passage 40 being provided with a restriction 42 which restricts the rate of fuel flow between the control chamber 32 and the chamber 23. By ensuring that little or no fuel can escape directly from the control chamber 32 to the chamber 23, and by ensuring that fuel is only able to flow from the control chamber 32 to the chamber 23 via the passage 40 at a restricted rate, the hydraulic amplification effect provided by fuel within the control chamber 32 is maximised and there is little or no loss of actuation stroke at relatively high actuation forces.

It will be appreciated that, in practice, the actuator housing 25 may be formed from any number of parts, one or more of the housing parts being provided with suitable drillings to provide the passage 40 and the restriction 42.

Figure 4:
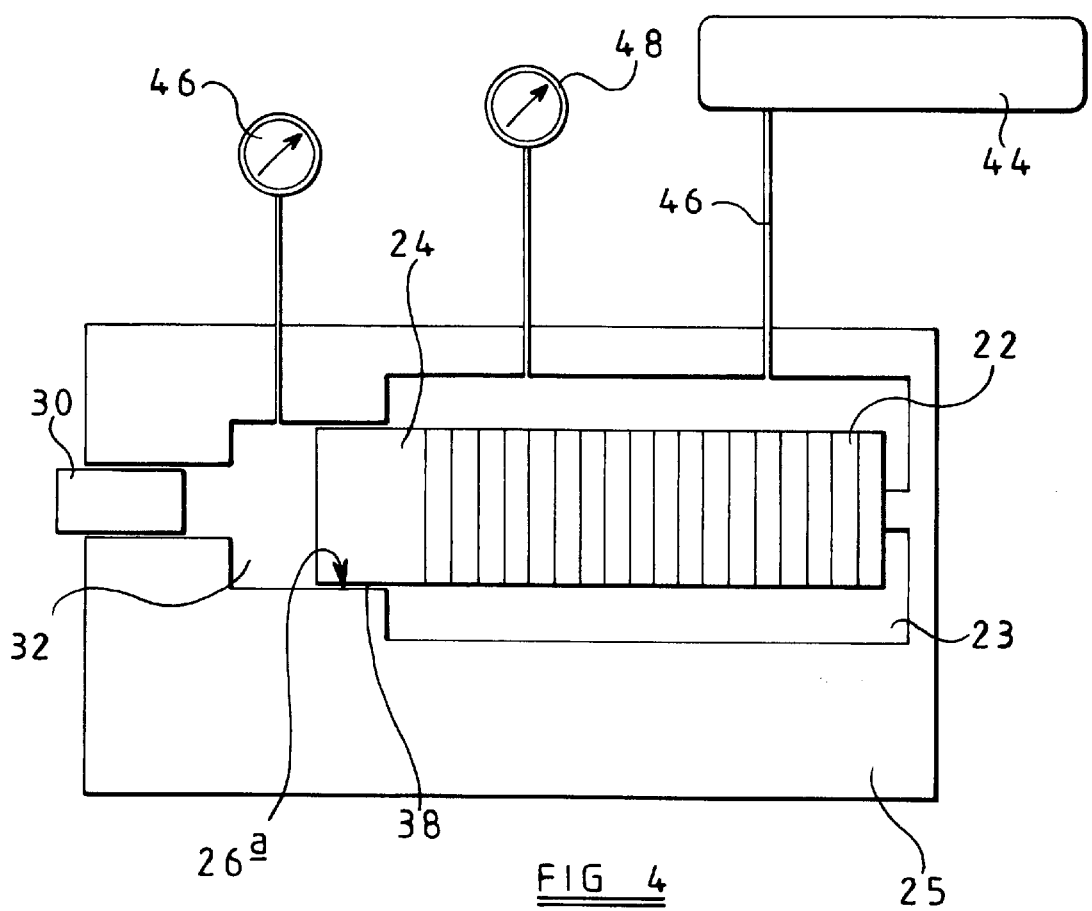

FIG. 4 shows a further alternative embodiment of the invention in which like reference numerals are used to denote similar parts to those shown in FIGS. 2 and 3. In this embodiment, as shown in FIG. 3, a substantially fluid tight seal 38 is provided between the input piston 24 and the enlarged diameter region 26a of the bore 26 to prevent fuel flow between the control chamber 32 and the chamber 23. Additionally, the passage 40 shown in FIG. 3 is removed such that there is no direct communication between the control chamber 32 and the chamber 23. Instead, a source of fluid 44 is provided which supplies fluid to the chamber 23 via a passage 46. The arrangement further includes a first pressure transducer 46 for measuring fuel pressure within the control chamber 32 and a second pressure transducer 48 for measuring fluid pressure within the chamber 23, the supply of fluid from the source 44 being regulated in response to the measured fuel pressure within the control chamber 32 such that fluid pressure within the chamber 23 is maintained at substantially the same level as that within the chamber 32. Thus, the force exerted on the exterior surface of the piezoelectric stack 22 due to fluid pressure within the chamber 23 serves to oppose the force due to fuel pressure within the control chamber 32. Domain switching within the lattice of the piezoelectric material is therefore suppressed, as described hereinbefore, ensuring that large displacements of the piezoelectric stack 22 are not compromised.

The embodiment of the invention in FIG. 4 provides the further advantage that, as leakage from the control chamber 32 to the chamber 23 does not occur, no loss of the actuation stroke occurs. This is particularly important in circumstances in which the period for which the actuation force is to be applied is relatively long.

It will be appreciated that the fluid supplied to the chamber 23 in FIG. 4 may conveniently take the form of the fuel which is supplied to the control chamber 32. It will also be appreciated that the pressure transducers 46, 48 may be any suitable means for measuring fluid pressure within the chambers 32, 23.

It will be appreciated that the diameter of the output piston may be greater than that of the input piston such that, when the axial length of the piezoelectric stack is increased to cause movement to the input piston, the output piston is displaced by a smaller amount than the input piston by the ratio $d_i^2/d_o^2$. Such an arrangement is particularly advantageous for use in applications where relatively small displacements are required such as, for example, for micropositioning in machining applications.

As described hereinbefore, the actuator arrangement of the present invention is particularly suitable for use in controlling movement of a valve needle in a fuel injector arrangement. Preferably, the chamber within which the piezoelectric stack 22 is located may be arranged in a flow path between an injector inlet for fuel and an injector outlet through which fuel is delivered into the combustion space of the associated engine. The actuator arrangement may include a stack 22 of piezoelectric elements, as described with reference to FIGS. 2 to 4, or may include a single piezoelectric element.

It will be appreciated that the actuator arrangement may also be used in other applications, in particular applications in which relatively large actuation forces are required. For example, the actuator arrangement may be used as an aerospace actuator. The fluid within the control chambers 32, 23 may therefore be any substantially incompressible fluid and need not be fuel.

We claim:

1. An actuator arrangement comprising a piezoelectric element formed from a piezoelectric material, a first end of the piezoelectric element cooperating with an input piston member slidable within a bore, a surface associated with the input piston member defining, in part, a control chamber for fluid, fluid pressure within the control chamber acting on a surface associated with an output piston member, the fluid within the control chamber being substantially incompressible such that, in use, movement of the input piston member is transmitted to the output piston member, the piezoelectric element being arranged within a chamber for fluid such that fluid pressure within the chamber exerts a force on at least a part of the surface of the piezoelectric element which serves to oppose a load exerted on the piezoelectric element due to fluid pressure within the control chamber, thereby suppressing distortions in the piezoelectric material.

2. An actuator arrangement as claimed in claim 1, wherein the input piston member has a diameter which is greater than that of the output piston member.

3. An actuator arrangement as claimed in claim 1, wherein the input piston member has a diameter which is smaller than that of the output piston member such that the output piston member is caused to be displaced by a smaller amount than the input piston member.

4. An actuator arrangement as claimed in claim 1, wherein the actuator arrangement includes a clearance passage which permits fluid to escape from the control chamber to the chamber, in use, such that fluid pressures within the chamber and the control chamber tend to equalize.

5. An actuator arrangement as claimed in claim 4, wherein the clearance passage has a restricted diameter to ensure fluid flow from the control chamber to the chamber, in use, occurs at a relatively low rate.

6. An actuator arrangement as claimed in claim 5, wherein the clearance passage is defined by one or more drillings provided in a housing for the actuator arrangement.

7. An actuator arrangement as claimed in claim 5, wherein the clearance passage is defined between the input piston member and the bore within which the input piston member is slidable.

8. An actuator arrangement as claimed in claim 4, wherein the clearance passage is defined by one or more drillings provided in a housing for the actuator arrangement.

9. An actuator arrangement as claimed in claim 4, wherein the clearance passage is defined between the input piston member and the bore within which the input piston member is slidable.

10. An actuator arrangement as claimed in claim 1, wherein the control chamber is substantially sealed from the chamber, the actuator arrangement further including a first arrangement for measuring fluid pressure within the control chamber and a second arrangement for supplying fluid to the chamber in response to the measured fluid pressure such that fluid pressure within the chamber is maintained at a level substantially equal to that within the control chamber, in use.

11. An actuator arrangement as claimed in claim 1, wherein the output piston member is connected to a valve needle forming part of a fuel injector.

12. An actuator arrangement as claimed in claim 11, whereby, in use, the control chamber is supplied with fuel to be delivered by the fuel injector to a combustion space of an internal combustion engine.

13. A fuel injector as claimed in claim 12, comprising a stack of piezoelectric elements.

14. An actuator arrangement as claimed in claim 1, wherein the output piston member is a valve needle forming part of a fuel injector.

15. A fuel injector comprising an actuator arrangement as claimed in any of claims 1 to 14, the fuel injector comprising a valve needle which is operable under the control of the actuator arrangement, the valve needle being engageable with a seating to control fuel delivery through an injector outlet, wherein the chamber is arranged to receive pressurized fuel, in use, through an injector inlet.

16. A fuel injector as claimed in claim 15, wherein the chamber is arranged within a flow path between the injector inlet and the injector outlet.

* * * * *